_US008476358B2_

United States Patent
Hashemzadeh et al.

(10) Patent No.: US 8,476,358 B2
(45) Date of Patent: Jul. 2, 2013

(54) USE OF VINYL ESTER COPOLYMERS AS LOW-PROFILE ADDITIVES (LPAS)

(75) Inventors: Abdulmajid Hashemzadeh, Burgkirchen (DE); Michael Tobias Zarka, Burghausen (DE)

(73) Assignee: Wacker Chemie AG, Munich (DE)

( * ) Notice: Subject to any disclaimer, the term of this patent is extended or adjusted under 35 U.S.C. 154(b) by 4 days.

(21) Appl. No.: 13/255,360

(22) PCT Filed: Mar. 8, 2010

(86) PCT No.: PCT/EP2010/052877
§ 371 (c)(1),
(2), (4) Date: Sep. 9, 2011

(87) PCT Pub. No.: WO2010/102966
PCT Pub. Date: Sep. 16, 2010

(65) Prior Publication Data
US 2011/0319547 A1    Dec. 29, 2011

(30) Foreign Application Priority Data
Mar. 11, 2009    (DE) .................. 10 2009 001 498

(51) Int. Cl.
*C08L 29/04*    (2006.01)
*C08F 4/28*    (2006.01)
*C08F 2/00*    (2006.01)
*C08F 118/02*    (2006.01)
*C08F 210/00*    (2006.01)

(52) U.S. Cl.
USPC ........ 524/503; 526/317.1; 526/319; 526/348; 526/227; 526/233

(58) Field of Classification Search
USPC ............... 524/503; 526/317.1, 319, 348, 227, 526/233
See application file for complete search history.

(56) References Cited

U.S. PATENT DOCUMENTS

| | | | |
|---|---|---|---|
| 3,718,714 A | 2/1973 | Comstock | |
| 3,988,388 A | 10/1976 | Alberts et al. | |
| 6,166,113 A * | 12/2000 | Haerzschel et al. | 524/5 |
| 2005/0027061 A1 * | 2/2005 | Van Dijk et al. | 524/495 |
| 2008/0262152 A1 | 10/2008 | Koehler | |
| 2009/0030168 A1 | 1/2009 | Schorm | |
| 2009/0105405 A1 | 4/2009 | Graewe | |
| 2009/0182090 A1 | 7/2009 | Graewe | |
| 2009/0192242 A1 * | 7/2009 | Willimann et al. | 524/5 |

FOREIGN PATENT DOCUMENTS

| | | |
|---|---|---|
| CN | 101326205 | 12/2008 |
| DE | 102006007282 A1 | 8/2007 |
| DE | 102006019686 A1 | 10/2007 |
| EP | 0075765 A1 | 4/1983 |
| EP | 0337931 A1 | 10/1989 |
| WO | 2007104639 | 9/2007 |

OTHER PUBLICATIONS

Fox T. G., Bull. Am. Physics Soc. 1, 3, p. 123 (1956).
Polymer Handbook 2nd Edition, J. Wiley & Sons, New York (1975).
International Search Report issued in PCT/EP2010/052877 filed Mar. 8, 2010, mailed Jul. 20, 2010.

* cited by examiner

*Primary Examiner* — William Cheung
(74) *Attorney, Agent, or Firm* — RatnerPrestia

(57) ABSTRACT

The invention relates to the use of protective-colloid-stabilized vinyl ester/ethylene copolymers in the form of polymer powder as low-profile-additives (LPAs).

17 Claims, No Drawings

USE OF VINYL ESTER COPOLYMERS AS LOW-PROFILE ADDITIVES (LPAS)

CROSS REFERENCE TO RELATED APPLICATIONS

This application is the national phase filing of international patent application No. PCT/EP2010/052877, filed 8 Mar. 2010, and claims priority of German patent application number 10 2009 001 498.5, filed 11 Mar. 2009, the entireties of which applications are incorporated herein by reference.

FIELD OF THE INVENTION

The invention relates to the use of vinyl ester copolymers as low-profile additives (LPAs), to processes for producing radically crosslinkable polymer compositions, and to composite components.

BACKGROUND OF THE INVENTION

Composite components are frequently produced using radically crosslinkable polymer compositions based, for example, on unsaturated polyester resins (UP resins). Unsaturated polyester resins are obtainable by polycondensation of dicarboxylic acids or dicarboxylic anhydrides with polyols. The radically crosslinkable polymer compositions further comprise monomers having ethylenically unsaturated groups, generally styrene. Styrene is added to the radically crosslinkable polymer composition in order, for example, to dissolve the crosslinkable polymer and to ensure that the radically crosslinkable polymer composition is a fluid material. As further constituents, the radically crosslinkable polymer compositions often further comprise fiber materials such as glass fibers, carbon fibers or corresponding fiber mats (Fiber Reinforced Plastic composites; FPR composites), which lead to reinforcement of the composite components obtainable by curing the radically crosslinkable polymer compositions.

A problem associated with the processing of such radically crosslinkable polymer compositions to composite components is the volume contraction in the course of curing of the polymer composition. In order to reduce the shrinkage on curing, therefore, the radically crosslinkable polymer compositions are admixed with additives known as low-profile additives. Low-profile additives reduce the shrinkage on curing, dissipate intrinsic stresses, reduce microcracking, and facilitate compliance with manufacturing tolerances. The LPAs are typically thermoplastic homopolymers and copolymers of polystyrene, polymethyl methacrylate or polyvinyl acetate, and are used in the form of solid resins. For example, in U.S. Pat. No. 3,718,714 or in DE-A 102006019686, copolymers based on vinyl acetate and ethylenically unsaturated carboxylic acids are recommended as LPAs for the production of composite components based on unsaturated polyester resins. For the production of composite components, EP-A 0075765 recommends radically crosslinkable polymer compositions comprising as LPAs polymers based on vinyl acetate and/or alkyl acrylates, and ethylenically unsaturated fatty acid esters as well.

EP-A 0337931 describes LPAs in the form of redispersible polymer powders based on copolymers of vinyl acetate and Versatic acid vinyl esters for producing composite components at low temperatures.

The polyvinyl ester copolymers hitherto commonplace as LPAs do usually produce a substantial antishrinkage effect, in comparison to polystyrene and polymethyl methacrylate, that are unsatisfactory in terms of pigmentation. Good pigmentation means that the curing of radically curable polymer compositions comprising pigments produces composite components having a uniform colored appearance; in other words, the pigments are uniformly distributed in the components. With poor pigmentation, in contrast, the pigments are not uniformly distributed in the composite components, and an effect occurs which is referred to as marbling.

In order for the LPAs to be able to develop their effect in the radically curable polymer compositions, the LPAs must be present in dissolved form. A disadvantage is that the dissolution of the commonplace LPAs takes a very long time. For this reason, the LPAs are commonly first dissolved in styrene, in a separate, time-consuming process step, and then incorporated in this form into the radically curable polymer compositions. A further problem is posed by the storage of the LPA-containing styrenic solutions, since such solutions have a tendency toward uncontrolled polymerization, and, moreover, measures must be taken in order to prevent premature polymerization.

SUMMARY OF THE INVENTION

Against this background, the object was to provide low-profile additives (LPAs) in the form of solids which can be used for the production of composite components, without lengthy process steps for dissolution, and, when so used, result in a substantial antishrinkage effect and, furthermore, in effective pigmentation of the composite components.

Surprisingly this object has been achieved by the use of protective colloid-stabilized vinyl ester-ethylene copolymers in the form of polymer powders as LPAs. These powders are free-flowing and blocking-resistant and can be incorporated readily into radically curable polymer compositions. Vinyl ester-ethylene copolymers in the form of solid resins, in contrast, are generally sticky, and tend toward blocking.

DETAILED DESCRIPTION OF THE INVENTION

The invention provides for the use of protective colloid-stabilized vinyl ester-ethylene copolymers in the form of polymer powders as low-profile additives (LPAs).

The vinyl ester-ethylene copolymers may be obtained by radically initiated polymerization of
a) one or more vinyl esters and
b) ethylene and optionally
c) one or more further ethylenically unsaturated comonomers.

Ethylene b) is used, for preparing the vinyl ester-ethylene copolymers, preferably at 5% to 70%, more preferably at 10% to 50%, and most preferably at 15% to 40%, by weight, based in each case on the total mass of the monomers employed overall for preparing the vinyl ester-ethylene copolymers.

Suitable vinyl esters a) are, for example, vinyl esters of carboxylic acids having 1 to 15 C atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 5 to 13 C atoms, as for example VeoVa9R or VeoVa10R (trade names of Shell). Particularly preferred is vinyl acetate.

Vinyl esters a) are used, for preparing the vinyl ester-ethylene copolymers, preferably at 30% to 95%, more preferably at 50% to 90%, and most preferably at 60% to 85%, by weight, based in each case on the total mass of the monomers employed overall for preparing the vinyl ester-ethylene copolymers.

As comonomers c) it is possible to select one or more monomers from the grouping encompassing methacrylic esters or acrylic esters of carboxylic acids with unbranched or branched alcohols having 1 to 15 C atoms, ethylenically unsaturated silanes, vinylaromatics, vinyl halides, dienes, and non-ethyleneolefins.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate, hydroxyethyl acrylate. Particularly preferred are methyl acrylate, methyl methacrylate, n-butyl acrylate, hydroxyethyl acrylate, and 2-ethylhexyl acrylate.

Preferred dienes or non-ethyleneolefins are propylene and 1,3-butadiene. Preferred vinylaromatics are styrene and vinyltoluene. A preferred vinyl halide is vinyl chloride.

The comonomers c) are used, for preparing the vinyl ester-ethylene copolymers, preferably at 0% to 45%, more preferably at 0% to 10%, by weight, based on the total mass of the monomers employed overall for preparing the vinyl ester-ethylene copolymers.

Optionally it is also possible to copolymerize 0.05% to 5%, preferably 1% to 2%, by weight, based on the total weight of the vinyl ester-ethylene copolymers, of auxiliary monomers. Examples of auxiliary monomers are ethylenically unsaturated carboxylic acids, preferably acrylic acid, methacrylic acid, crotonic acid, itaconic acid or fumaric acid, maleic acid, ethylenically unsaturated carbonitriles, preferably acrylonitrile, monoesters and diesters of fumaric acid and maleic acid such as the diethyl and diisopropyl esters, and also maleic anhydride, ethylenically unsaturated sulfonic acids and their salts, preferably vinylsulfonic acid, 2-acrylamido-2-methylpropanesulfonic acid.

Examples of preferred vinyl ester-ethylene copolymers are copolymers of one or more vinyl esters with ethylene, copolymers of one or more vinyl esters with ethylene and one or more methacrylic esters or acrylic esters, copolymers of one or more vinyl esters with ethylene and one or more ethylenically unsaturated carboxylic acids, copolymers of one or more vinyl esters with ethylene and vinyl chloride.

Particular preference is given to copolymers of vinyl acetate with 15% to 40% by weight of ethylene; copolymers of vinyl acetate with 5% to 30% by weight of ethylene and 1% to 50% by weight of one or more further vinyl esters different from vinyl acetate; copolymers of vinyl acetate with 5% to 30% by weight of ethylene and 1% to 45% by weight of one or more methacrylic esters or acrylic esters; copolymers of vinyl acetate with 5% to 30% by weight of ethylene and 1% to 25% by weight of one or more further vinyl esters different from vinyl acetate, and 1% to 45% by weight of one or more methacrylic esters or acrylic esters; copolymers of vinyl acetate with 1% to 30% by weight of ethylene and 1% to 45% by weight of one or more ethylenically unsaturated carboxylic acids; the copolymers here may each also contain the stated auxiliary monomers in the stated amounts, and the amounts in % by weight add up to 100% by weight in each case.

The monomer selection and the selection of the weight fractions of the comonomers result in vinyl ester-ethylene copolymers having the desired glass transition temperature Tg. The glass transition temperature Tg of the copolymers can be determined in a known way by means of differential scanning calorimetry (DSC). The Tg may also be calculated approximately in advance by means of the Fox equation. According to Fox T. G., Bull. Am. Physics Soc. 1, 3, page 123 (1956), it holds that: $1/Tg=x1/Tg1+x2/Tg2+\ldots+xn/Tgn$, where xn is the mass fraction (% by weight/100) of the monomer n, and Tgn is the glass transition temperature, in kelvins, of the homopolymer of the monomer n. Tg values for homopolymers are listed in Polymer Handbook, 2nd Edition, J. Wiley & Sons, New York (1975).

Vinyl ester-ethylene copolymers are prepared in aqueous medium and preferably by the emulsion or suspension polymerization process —as described in DE-A 102006007282, for example. In such cases the vinyl ester-ethylene copolymers are obtained in the form of aqueous dispersions. For the polymerization it is possible to use the commonplace protective colloids and/or emulsifiers, as described in DE-A 102006007282. Preferred as protective colloids are partially hydrolyzed or fully hydrolyzed polyvinyl alcohols having a degree of hydrolysis of 80 to 100 mol %, more particularly partially hydrolyzed polyvinyl alcohols having a degree of hydrolysis of 80 to 94 mol % and a Höppler viscosity, in 4% strength aqueous solution, of 1 to 30 mPas (Höppler method at 20° C., DIN 53015). The stated protective colloids are obtainable by means of processes known to the skilled person, and are added in general in an amount totaling 1% to 20% by weight, based on the total weight of the monomers, in the polymerization.

The vinyl ester-ethylene copolymers in the form of aqueous dispersions can be converted into corresponding powders by commonplace drying techniques. In such techniques it is usual to use a drying aid in a total amount of 3% to 30%, preferably 5% to 20%, by weight, based on the polymeric constituents of the dispersion. Preferred drying aids are the aforementioned polyvinyl alcohols.

The glass transition temperature Tg of the vinyl ester-ethylene copolymers is preferably between −40° C. and +30° C., more preferably between −40° C. and +5° C. The average particle diameter of the protective colloid-stabilized vinyl ester-ethylene copolymers in the form of polymer powder is preferably between 0.1 and 500 micrometers, more preferably between 1 and 200 micrometers (Coulter determination).

The invention further provides radically crosslinkable polymer compositions comprising one or more radically crosslinkable polymers, one or more ethylenically unsaturated monomers (reactive monomers) and optionally initiators, optionally fillers, and optionally further additions, characterized in that additionally one or more protective colloid-stabilized vinyl ester-ethylene copolymers in the form of polymer powder are present.

Suitable, preferred and particularly preferred reactive monomers are, for example, the same monomers also suitable, preferred and particularly preferred, respectively, for the polymerization for preparing the vinyl ester-ethylene copolymers. Especially preferred reactive monomers are styrene, methyl methacrylate, methyl acrylate, dipropylene glycol diacrylate, tri-methylolpropane triacrylate, 1,6-hexanediol diacrylate, pentaerythritol triacrylate, and butyl acrylate. The most preferred reactive monomer is styrene.

Preferred radically crosslinkable polymers are unsaturated polyester resins or vinyl ester resins.

The unsaturated polyester resins are reaction products of one or more dicarboxylic acids or of one or more dicarboxylic anhydrides with one or more polyols. The preparation of the unsaturated polyester resins is known to the skilled person.

Vinyl ester resins are reaction products formed by polyaddition reactions or esterification reactions of phenol derivatives and ethylenically unsaturated monocarboxylic or dicarboxylic acids or dicarboxylic anhydrides having 3 to 20 carbon atoms, such as acrylic acids or methacrylic acids, for example. Preferred phenol derivatives are bisphenol A and phenol novolak. The preparation of the vinyl ester resins is known to the skilled person.

Suitable initiators are, for example, t-butyl perbenzoate, t-butyl peroxy-2-ethylhexanoate, t-butyl peroxypivalate, t-butyl peroxyneodecanoate, dibenzoyl peroxide, t-amylperoxypivalate, di(2-ethylhexyl) peroxydicarbonate, 1,1-bis(t-butylperoxy)-3,3,5-tri-methylcyclohexane, di(4-t-butylcyclohexyl) peroxy-dicarbonate, azobisisobutyronitrile or else photoinitiators, such as benzophenone, isopropyl-thioxanthone, benzils (1,2 diketones), hydroxyalkyl ketones, α-amino ketones, and benzil ketals.

Suitable fillers are, for example, talc, aluminum hydroxide, kaolin, calcium carbonate, dolomite, glass beads or glass fibers, quartz, aluminum oxide or barium sulfate.

The radically crosslinkable polymer compositions contain preferably 30 to 60 parts by weight of radically crosslinkable polymers, 5 to 40 parts by weight of protective colloid-stabilized vinyl ester-ethylene copolymers in the form of polymer powder, 30 to 160 parts by weight of reactive monomers, optionally 0.5 to 2 parts by weight of initiators, optionally fillers such as 50 to 350 parts by weight of calcium carbonate, reinforcing materials such as 25 to 450 parts by weight of glass fibers, aramid fibers, carbon fibers, optionally further additives such as 0.5 to 3 parts by weight of mold release agents, for example zinc stearate, and also, optionally, further adjuvants, examples being pigments, thickeners, flame retardants.

The invention further provides processes for preparing the radically crosslinkable polymer compositions by mixing one or more radically crosslinkable polymers, one or more ethylenically unsaturated monomers (reactive monomers) and optionally initiators, optionally fillers, optionally reinforcing materials, and optionally further additives or additions, characterized in that additionally one or more protective colloid-stabilized vinyl ester-ethylene copolymers in the form of polymer powder are admixed.

The protective colloid-stabilized vinyl ester-ethylene copolymers in the form of polymer powder can be mixed in any desired way with the further components of the radically crosslinkable polymer compositions. For example, the vinyl ester-ethylene copolymers may be dissolved, emulsified or dispersed in reactive monomers and mixed in that form with the further components of the radically crosslinkable polymer compositions. The vinyl ester-ethylene copolymers are preferably mixed with the radically crosslinkable polymers, the reactive monomers and optionally further liquid or dissolved components of the radically crosslinkable polymer compositions and subsequently mixed with the remaining solid components of the radically crosslinkable polymer compositions, such as fillers or reinforcing materials, for example. Alternatively it is also possible first to prepare a liquid paste from radically crosslinkable polymers, reactive monomers and optionally further components of the radically crosslinkable polymer compositions, this paste being subsequently admixed with vinyl ester-ethylene copolymers and also, where appropriate, with the remaining amounts of the remaining constituents of the radically crosslinkable polymer compositions.

The mixing of the components for preparing the radically crosslinkable polymer compositions may take place using the commonplace devices known to the skilled person, such as, for example, reactors, stirred tanks or mixers, and stirrers, such as paddle, anchor or blade stirrers, for example.

The invention further provides composite components obtainable by curing the radically crosslinkable polymer compositions.

The curing of the radically crosslinkable polymer compositions takes place preferably at temperatures of $\geq 0°$ C., more preferably from 20 to 200° C., and most preferably from 20 to 165° C. The curing takes place preferably in the presence of one or more initiators, by radically initiated polymerization. Where appropriate, the radically crosslinkable polymer compositions are pressed in the course of curing at the respective temperature, with application of pressures of $\geq 1$ mbar, more preferably of 1 to 200 000 mbar and most preferably of 1000 to 200 000 mbar.

The composite components may be obtained by all of the commonplace production processes from the radically crosslinkable polymer compositions, such as, for example, by means of sheet molding compound (SMC) technology, bulk molding compound (BMC) technology, resin transfer molding (RTM) or resin injection molding (RIM).

The composite components are produced preferably by means of the BMC (bulk molding compound) or SMC (sheet molding compound) technique.

In the case of the BMC process, the solutions of the radically crosslinkable polymers in reactive monomer, and the vinyl ester-ethylene copolymers, and optionally the further components such as the initiator, filler, mold release agent or additional polymers or adjuvants, are mixed to a paste-like mass, after which glass fibers, where appropriate, are mixed in, and the resulting radically crosslinkable polymer compositions are then cured to the composite component with application of pressure and temperature. This technique is used, for example, to produce reflectors for automobile headlights.

In the case of the SMC process, similarly to the BMC process, a paste-like mass is prepared from radically crosslinkable polymers in reactive monomer, the vinyl ester-ethylene copolymers, crosslinking catalyst, filler, mold release agent, and any further adjuvants, and is applied to two carrier films. Chopped glass fiber rovings are then scattered onto one of the two layers, and finally both carrier films are united with one another, causing the layers produced to come into mutual contact. This is followed by compacting by means of a system of rollers. The resulting sheetlike SMC compound is then rolled up and stored for at least three days under defined conditions, this process being termed maturing. Finally, the sheetlike sandwich is peeled from the film and cut into pieces, and is pressed to form moldings with application of pressure and temperature. Moldings produced by means of this technique are used, for example, as tailgates of automobiles.

The protective colloid-stabilized vinyl ester-ethylene copolymers in the form of polymer powder, when used as LPAs, have a very strong antishrinkage effect and at the same time lead to very effective pigmentation of the composite components. Furthermore, the protective colloid-stabilized vinyl ester-ethylene copolymers in the form of polymer powder are stable on storage and can be rapidly dissolved, emulsified or dispersed. In this respect, the LPAs of the invention are superior particularly in relation to the LPAs in the form of solid resins. Because of the presence of ethylene in the LPAs of the invention, composite components produced in accordance with the invention are also equipped with water repellency properties, and this also has positive consequences for the ageing resistance of the composite components. The composite components of the invention also display very good mechanical properties, such as flexural strengths and moduli of elasticity under flexure. This was also surprising for the reason in particular that the LPAs of the invention, because of the presence of ethylene, are internally plasticized and consequently a deterioration in the mechanical properties of composite components produced therewith might have been feared.

The examples below serve for further elucidation of the invention, without in any way restricting said invention.

Preparation of Low-Profile Additives (LPAs):

LPA 1:

An aqueous dispersion, stabilized with polyvinyl alcohol, of a vinyl acetate-ethylene copolymer (80% by weight vinyl acetate, 20% by weight ethylene, based in each case on the total weight of the copolymer; Tg −7° C.; 12% by weight polyvinyl alcohol, based on the total solids fraction of the dispersion) was spray-dried. The average particle size of the resultant powder was 120 μm (Coulter determination; instrument: Beckmann-Coulter LS 100Q).

C-LPA 2:

An aqueous dispersion, stabilized with polyvinyl alcohol, of a vinyl acetate-VeoVa10 copolymer (80% by weight vinyl acetate, 20% by weight VeoVa10, based in each case on the total weight of the copolymer; Tg 30° C.; 12% by weight polyvinyl alcohol, based on the total solids fraction of the dispersion) was spray-dried. The average particle size of the resultant powder was 120 μm (Coulter determination; instrument: Beckmann-Coulter LS 100Q).

Production of Composite Components:

First of all, the UP resin and all of the additives (see table) except for the glass fibers and filler (calcium carbonate) were premixed with a dissolver in a container for 2 minutes (resin paste). In a second step, this resin paste was mixed with the glass fibers and the calcium carbonate in a small laboratory kneading apparatus. The kneading time was varied between 5 and 15 minutes (see table 2).

The bulk molding compound (BMC) was then packed in such a way as to prevent styrene leakage with suitable films and stored at 23° C. for 2 days (maturing time), and then introduced into a Wickert press (pressing conditions: 3 minutes, 160° C., 730 KN pressing force, 3 mm sheet thickness).

TABLE 1

| Components | CEx. 1 [g] | CEx. 2 [g] | CEx. 3 [g] | CEx. 4 [g] | Ex. 5 [g] |
|---|---|---|---|---|---|
| Palapreg P 18-21 (UP resin)[a] | 62.5 | 62.5 | 62.5 | 62.5 | 62.5 |
| CC carbon black 9257-45 (pigment) | 10 | 10 | 10 | 10 | 10 |
| C501[b] (35% by weight in styrene) | | 14.5 | | | |
| Palapreg P 814-01[c] | | | 15 | | |
| C-LPA 2 | | | | 5 | |
| LPA 1 | | | | | 5 |
| styrene | 24.38 | 8.5 | 8 | 18 | 18 |
| peroxide (Trigonox C) | 1 | 1 | 1 | 1 | 1 |
| peroxide (Trigonox 21) | 0.5 | 0.5 | 0.5 | 0.5 | 0.5 |
| BYK 9010 additive | 0.5 | 0.5 | 0.5 | 0.5 | 0.5 |
| Luvato MK 35 (catalyst) | 3 | 3 | 3 | 3 | 3 |
| calcium stearate (lubricant) | 4 | 4 | 4 | 4 | 4 |
| PBQ[d] (inhibitor) | 0.3 | 0.3 | 0.3 | 0.3 | 0.3 |
| Millicarb OG (filler) | 300 | 300 | 300 | 300 | 300 |
| hydroquinone (stabilizer) | 0.03 | 0.03 | 0.03 | 0.03 | 0.03 |
| Owens Corning 163D-14C (4 mm length) (glass fiber) | 45 | 45 | 45 | 45 | 45 |

[a] trade name of DSM
[b] Vinnapas C501 (solid resin based on 99% by weight vinyl acetate, 1% by weight crotonic acid; trade name of Wacker Polymers);
[c] trade name of DSM, 33% strength by weight solution of polystyrene in styrene[b];
[d] p-hydroquinone in the form of a 10% strength by weight solution in methyl methacrylate.

The resultant, black-pigmented sheets were cooled to room temperature and subsequently tested as follows:

to characterize the mechanical quality, the elasticity modulus was determined in accordance with DIN EN ISO 1425;

shrinkage values (linear shrinkage): change in volume was ascertained by measurement and expressed as percentage values. Minus values indicate that the composite component was larger than the original mold.

the pigmentation was ascertained in accordance with optical assessment criteria (−=marbling effect, nonuniform pigment distribution; +++=homogeneous distribution of the pigments, uniform colored appearance; the assessments with + and ++ indicate corresponding states in between).

The results of the testing are set out in table 2.

TABLE 2

| Composite component | CEx. 1 | CEx. 2 | CEx. 3 | CEx. 4 | CEx. 4 | CEx. 4 | Ex. 5 |
|---|---|---|---|---|---|---|---|
| kneading times [min] | 5 | 5 | 5 | 5 | 15 | 5 | 15 |
| linear shrinkage [%] | 0.41 | 0.10 | 0.21 | 0.2 | 0.18 | 0.18 | 0.13 |
| pigmentation | +++ | − | +++ | − | + | ++ | +++ |
| elasticity modulus [MPa] | 12 584 | 14 219 | 14 300 | 14 001 | 14 022 | 14 011 | 14 221 |
| gloss[1] | 50 | 82 | 57 | 61 | 62 | 66 | 81 |
| longwave[2] | 12.0 | 1.8 | 3.3 | 3.5 | 2.5 | 2.8 | 1.8 |
| shortwave[2] | 32.2 | 12.7 | 14.0 | 16.0 | 13.5 | 14.9 | 12.6 |

[1] determined using the Byk-Gardner micro-haze plus instrument.
[2] determined using the Byk-Gardner micro-wave scan instrument.

Comparative example CEx. 2 (vinyl acetate copolymer C 501 as LPA) actually achieved the lowest shrinkage, but there was a pronounced marbling effect (uneven distribution of the pigment as a result of morphology). In comparative example CEx. 3 (polystyrene as LPA), effective pigmentation was achieved, but the linear shrinkage was more than twice as high as in comparative example CEx. 2.

Only in the inventive example, Ex. 5, were both very effective pigmentation and low shrinkage achieved. Inventive example 5 is notable, furthermore, for a very good surface quality (low shortwave and longwave values: signs of low surface waviness) and a glossy surface. The comparative examples CEx. 1, CEx. 3, and CEx. 4, in contrast, are unsatisfactory in respect of gloss and surface quality as well.

The inventive component of Ex. 5 is notable in relation to the composite component CEx. 4, which contains a vinyl acetate-VeoVa copolymer in the form of a water-redispersible powder as LPA, for better pigmentation, a better surface quality (gloss, shortwave, and longwave), and for a lower shrinkage as well.

The invention claimed is:

1. A radically crosslinkable polymer composition comprising one or more radically crosslinkable polymers, one or more ethylenically unsaturated monomers (reactive monomers) and optionally initiators, optionally fillers, and optionally further additions, wherein
additionally one or more protective colloid-stabilized vinyl ester-ethylene copolymers in the form of polymer powder are present.

2. The radically crosslinkable polymer composition as claimed in claim 1, wherein the one or more radically crosslinkable polymers comprise unsaturated polyester resins or vinyl ester resins.

3. A process for producing a radically crosslinkable polymer composition, comprising mixing one or more radically crosslinkable polymers, one or more ethylenically unsaturated monomers (reactive monomers) and optionally initiators, optionally fillers, optionally reinforcing materials, and optionally further additives or additions, wherein
additionally one or more protective colloid-stabilized vinyl ester-ethylene copolymers in the form of polymer powder are admixed.

4. A composite component obtained by curing the radically crosslinkable polymer composition as claimed in claim 1.

5. A composite component obtained by curing the radically crosslinkable polymer composition as claimed in claim 2.

6. The composition as claimed in claim 1, wherein the vinyl ester-ethylene copolymer is obtained by radically initiated polymerization of
a) one or more vinyl esters and
b) ethylene and optionally
c) one or more further ethylenically unsaturated comonomers.

7. The composition as claimed in claim 1, wherein the vinyl ester-ethylene copolymer contains 5% to 70% by weight of ethylene b), based on the total mass of the vinyl ester-ethylene copolymer.

8. The composition as claimed in claim 6, wherein the one or more vinyl esters a) comprise vinyl esters of carboxylic acids having 1 to 15 C atoms.

9. The composition as claimed in claim 1, wherein the protective colloid-stabilized vinyl ester-ethylene copolymer in the form of polymer powder has an average particle diameter between 0.1 and 500 micrometers (Coulter determination).

10. The composition as claimed in claim 1, wherein the composition consists of 30 to 60 parts by weight of radically crosslinkable polymers, 5 to 40 parts by weight of protective colloid-stabilized vinyl ester-ethylene copolymers in the form of polymer powder, 30 to 160 parts by weight of reactive monomers, optionally 0.5 to 2 parts by weight of initiators, optionally fillers, reinforcing materials, optionally additives and optionally adjuvants.

11. The composition as claimed in claim 1, wherein the protective colloid-stabilized vinyl ester-ethylene copolymers in the form of polymer powder are obtained by drying vinyl ester-ethylene copolymers in the form of aqueous dispersions wherein 3% to 30% by weight, based on the polymeric constituents of the dispersion, drying aids selected from the group consisting of polyvinyl alcohols are applied.

12. The process as claimed in claim 3, wherein the vinyl ester-ethylene copolymer is obtained by radically initiated polymerization of
a) one or more vinyl esters and
b) ethylene and optionally
c) one or more further ethylenically unsaturated comonomers.

13. The process as claimed in claim 3, wherein the vinyl ester-ethylene copolymer contains 5% to 70% by weight of ethylene b), based on the total mass of the vinyl ester-ethylene copolymer.

14. The process as claimed in claim 13, wherein the one or more vinyl esters a) comprise vinyl esters of carboxylic acids having 1 to 15 C atoms.

15. The process as claimed in claim 3, wherein the protective colloid-stabilized vinyl ester-ethylene copolymer in the form of polymer powder has an average particle diameter between 0.1 and 500 micrometers (Coulter determination).

16. The process as claimed in claim 3, wherein the radically crosslinkable polymer composition consists of 30 to 60 parts by weight of radically crosslinkable polymers, 5 to 40 parts by weight of protective colloid-stabilized vinyl ester-ethylene copolymers in the form of polymer powder, 30 to 160 parts by weight of reactive monomers, optionally 0.5 to 2 parts by weight of initiators, optionally fillers, reinforcing materials, optionally additives and optionally adjuvants.

17. The process as claimed in claim 3, wherein the protective colloid-stabilized vinyl ester-ethylene copolymers in the form of polymer powder are obtained by drying vinyl ester-ethylene copolymers in the form of aqueous dispersions wherein 3% to 30% by weight, based on the polymeric constituents of the dispersion, drying aids selected from the group consisting of polyvinyl alcohols are applied.

* * * * *

UNITED STATES PATENT AND TRADEMARK OFFICE
CERTIFICATE OF CORRECTION

PATENT NO. : 8,476,358 B2  
APPLICATION NO. : 13/255360  
DATED : July 2, 2013  
INVENTOR(S) : Abdulmajid Hashemzadeh and Michael Tobias Zarka Page 1 of 1

It is certified that error appears in the above-identified patent and that said Letters Patent is hereby corrected as shown below:

In the Claims

At Column 9, line 28, before the word "polymer" please insert the word --micronized--.

At Column 9, line 40, before the word "polymer" please insert the word --micronized--.

At Column 10, line 6, before the word "polymer" please insert the word --micronized--.

At Column 10, line 13, before the word "polymer" please insert the word --micronized--.

At Column 10, line 19, before the word "polymer" please insert the word --micronized--.

At Column 10, line 40, before the word "polymer" please insert the word --micronized--.

At Column 10, line 46, before the word "polymer" please insert the word --micronized--.

At Column 10, line 52, before the word "polymer" please insert the word --micronized--.

Signed and Sealed this  
Eleventh Day of March, 2014

Michelle K. Lee  
*Deputy Director of the United States Patent and Trademark Office*